Sept. 29, 1959 G. J. SCHERBA 2,906,565

BEARING SEAL FOR ROLLING MILL ROLL

Filed March 12, 1958

INVENTOR
GEORGE J. SCHERBA
By Donald G. Dalton
Attorney 2,906,565
Patented Sept. 29, 1959

2,906,565

BEARING SEAL FOR ROLLING MILL ROLL

George J. Scherba, Pittsburgh, Pa., assignor to United States Steel Corporation, a corporation of New Jersey Application March 12, 1958, Serial No. 720,999

1 Claim. (Cl. 308—36.3)

The present invention relates generally to rolling mill equipment and more particularly to an improved dirt seal for rolling mill bearings.

It is an object of the present invention to provide an improved bearing seal for keeping dirt and other foreign material out of the lubricant seal of a roll-neck bearing.

Another object of the invention is to provide a dirt seal for a roll-neck bearing which can be disposed between the bearing housing of a roll mill stand and the end face of the roll body of a roll journaled in the roll stand and which includes means for constantly urging the dirt seal under regulated pressure against the end face of the roll body.

Another object of the invention is to provide a dirt seal for a roll-neck bearing which remains in operative position regardless of movement or misalignment of the bearing chucks.

A further object of the invention is to provide a dirt seal for a roll-neck bearing having means for indicating the effectiveness of the lubrication seal of the roll-neck bearing.

These and other objects will become more apparent after referring to the following specification and attached drawings, in which.

Figure 1:
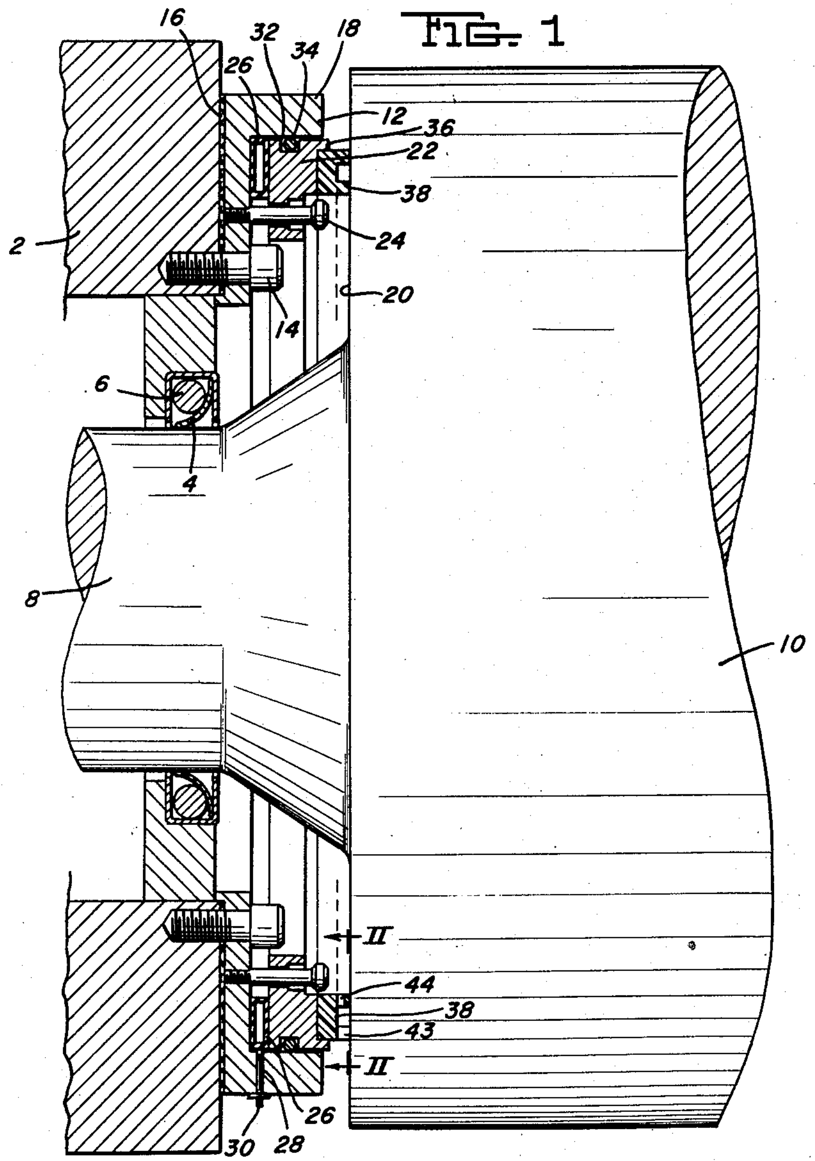
Figure 1 is a vertical sectional view.

Referring more particularly to the drawings reference numeral 2 designates generally the bearing housing of a rolling mill stand having a lubricant seal 4 held in position by a garter spring 6 against the neck 8 of a roll 10 journaled in the bearing housing of the mill stand. This construction is conventional and is not claimed as part of the present invention the details of which will now be described.

Reference numeral 12 designates an annular metal flange substantially L-shape in cross section which is rigidly affixed to the inner face of the bearing housing 2 by means of bolts 14. A packing 16 may be provided between the bearing housing and the flange. The short leg 18 of the L-shaped flange projects toward the end face 20 of the body of roll 10.

An annular metal backing ring 22 is movably mounted on flange 12 by means of studs 24 within the shoulder formed by the short leg 18 of the L-shape flange. The outer periphery of backing ring 22 is provided with a recess 32 adjacent the short leg 18 of the L-shape flange for receiving an annular packing ring 34. An annular inflatable tube 26 made of flexible material which is preferably oil-resistant is disposed between the backing ring 22 and the flange 12. Tube 26 is provided with a stem 28 inserted through a hole in the short leg 18 in the lower portion of flange 12. An air valve 30 is attached to the projecting end of stem 28 whereby air can be admitted to tube 26 to inflate it to urge backing ring 22 toward the end face 20 of roll 10.

The forward end of backing ring 22 is formed with a relatively short ledge 36 for receiving a channel shape annular sealing ring 38 having integral spaced inner and outer flanges 40 and 42, respectively, projecting toward the end face 20 of the body of roll 10. Sealing ring 38 is preferably made of non-metallic material having wear-resistant qualities, such as micarta, lignaloy or the like. The flanged end of sealing ring 38 is normally in contact with the end face 20 of roll 10.

Figure 2:
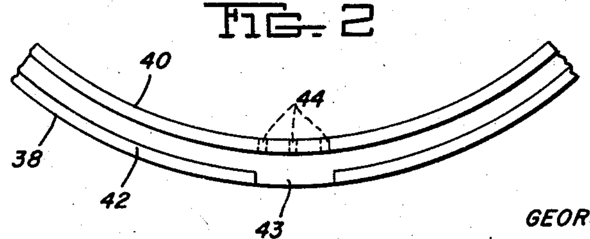
Figure 2 is a partial end view taken on the line II—II of Figure 1.

As best shown in Figure 2, the lowermost portion of outer flange 42 is cut away as at 43 and the lowermost portion of inner flange 40 adjacent to the cut-away portion 43 is provided with three spaced vertical holes 44, the function and purpose of which will become apparent hereinafter.

In operation, the elements of the seal of the invention are assembled as described above and shown in Figure 1. Air under pressure is then passed into tube 26 through valve 30 and stem 28. This causes inflation of tube 26 which in turn moves backing ring 22 outwardly toward the end face 20 of the body of roll 10. It will be noted that water, oil or other fluid may be used for inflating tube 26 by modifying valve 30 if desired.

Outward movement of the backing ring 22 caused by inflation of tube 26 moves the sealing ring 38 into contact with end face 20. Pressure of contact between ring 38 and end face 20 is regulated by the degree of inflation of tube 26. It is preferable to have ring 38 contacting face 20 only lightly to minimize wear on the ring. Any dirt that may have entered between ring 38 and face 20 during assembly of the seal into operative position will ride between the inner and outer flanges 40 and 42 to the cut-away portion of flange 42 where it can escape during rotation of roll 10.

If the lubricant seal 4 becomes defective causing lubricant to leak, such leaking lubricant will pass through the holes 44 in inner flange 40 and warn of the defective condition of the lubricant seal.

While one embodiment of my invention has been shown and described, it will be apparent that other adaptations and modifications may be made without departing from the scope of the following claim.

I claim:

A bearing seal for a mill roll having a roll neck projecting from one end of its body journaled in a bearing housing which comprises an annular flange surrounding said roll neck between said one end of the roll body and said bearing housing, an annular backing ring adjustably affixed to said flange for adjustable movement toward and away from said one end of the roll body, an annular sealing ring on said backing ring projecting toward and adapted to contact said one end of said roll body, said sealing ring being substantially channel shape in cross section along the majority of its circumference with spaced inner and outer flanges projecting toward said one end of said roll body, the outer flange of said sealing ring being cut away in the lowermost portion of said sealing ring, the portion of the inner flange of said sealing ring in said lowermost portion thereof having spaced vertical holes therethrough, an inflatable annular tube carried by said flange and disposed between said flange and said backing ring whereby said backing ring is urged toward said one end of said roll body when said tube is inflated and means for inflating said tube.

References Cited in the file of this patent

FOREIGN PATENTS

| | | |
|---|---|---|
| 138,707 | Australia | Sept. 18, 1950 |
| 754,340 | Germany | Jan. 31, 1952 |